US012774294B2

(12) United States Patent
Fero et al.

(10) Patent No.: US 12,774,294 B2
(45) Date of Patent: Oct. 27, 2026

(54) METHOD AND SYSTEM FOR SELECTIVE RECOVERY OF MONOCHLOROSILANE AND DICHLOROSILANE IN POLYSILICON PRODUCTION PROCESS

(71) Applicant: Advanced Material Solutions, LLC, Missoula, MT (US)

(72) Inventors: Chad Fero, Missoula, MT (US); Kevin Papp, Missoula, MT (US); Joah Smith, Lolo, MT (US); Joshua Flynn, Missoula, MT (US)

(73) Assignee: Advanced Material Solutions, LLC

( * ) Notice: Subject to any disclaimer, the term of this patent is extended or adjusted under 35 U.S.C. 154(b) by 501 days.

(21) Appl. No.: 18/518,653

(22) Filed: Nov. 24, 2023

(65) Prior Publication Data

US 2024/0182497 A1 Jun. 6, 2024

Related U.S. Application Data

(60) Provisional application No. 63/385,930, filed on Dec. 2, 2022.

(51) Int. Cl.

| | |
|---|---|
| ***C07F 7/02*** | (2006.01) |
| ***B01D 3/14*** | (2006.01) |
| ***C01B 21/087*** | (2006.01) |
| ***C01B 33/04*** | (2006.01) |
| ***C01B 33/107*** | (2006.01) |

(52) U.S. Cl.

CPC .............. *C07F 7/025* (2013.01); *B01D 3/143* (2013.01); *C01B 21/087* (2013.01); *C01B 33/043* (2013.01); *C01B 33/1071* (2013.01); *C01B 33/10778* (2013.01)

(58) Field of Classification Search

CPC .......... C01B 33/1071; C01B 33/10778; C01B 21/087; C01B 33/043; C07F 7/025; B01D 3/143

See application file for complete search history.

(56) References Cited

U.S. PATENT DOCUMENTS

| | | | | |
|---|---|---|---|---|
| 5,118,485 | A * | 6/1992 | Arvidson | C23C 16/44 427/255.393 |
| 2009/0060820 | A1 * | 3/2009 | Shimizu | C01B 33/03 427/255.393 |
| 2013/0156675 | A1 * | 6/2013 | Breneman | C01B 33/1071 423/342 |
| 2016/0068399 | A1 * | 3/2016 | Ponnuswamy | C01B 33/1071 203/91 |

OTHER PUBLICATIONS

Lv ("Advances in production and optimization of electronic-grade polysilicon: A review of modified Siemens and silane methods" Solar Energy Materials & Solar Cells, 2025, p. 113446). (Year: 2025).*

* cited by examiner

*Primary Examiner* — Amy C Bonaparte
(74) *Attorney, Agent, or Firm* — NKL Law; Jae Youn Kim

(57) ABSTRACT

A method and system for selectively recovering monochlorosilane and dichlorosilane from polysilicon production process are provided. The system and method selectively recover the monochlorosilane and the dichlorosilane contained in an exhaust stream discharged from a chemical vapor deposition unit for a polysilicon production process and the monochlorosilanes and the dichlorosilanes may be obtained with minimal capital investment or complexity.

14 Claims, 5 Drawing Sheets

100

100

METHOD AND SYSTEM FOR SELECTIVE RECOVERY OF MONOCHLOROSILANE AND DICHLOROSILANE IN POLYSILICON PRODUCTION PROCESS

BACKGROUND

Field

One or more embodiments of the present invention relate to a method for selective recovery of monochlorosilane and dichlorosilane from a polysilicon production process and a system thereof.

Description of the Related Art

Polysilicon is a source material of semiconductors and photovoltaic solar panels. There are several methods to produce polysilicon, but the most common method is the Siemens® process. The Siemens® process is the growth of silicon onto electrified silicon filaments by chemical vapor deposition of silicon from typically a mixture of a purified trichlorosilane with an excess of hydrogen. The exhaust stream from the Siemens® process contains unreacted hydrogen and trichlorosilane as well as byproducts monochlorosilane, dichlorosilane, tetrachlorosilane and hydrogen chloride.

Monochlorosilane, which is included in the exhaust stream from the chemical vapor deposition reactor, can be a precursor for synthesizing trisilylamine or diisopropylaminosilane. Trisilylamine and diisopropylaminosilane are used in the semiconductor chip manufacturing process as a precursor of silicon nitrogen and silicon oxynitride films.

Dichlorosilane, which is also included in the exhaust stream from the chemical vapor deposition reactor, can be a precursor of bis(tertiary-butylamino)silane or bis(Diethylamino)silane. The aminosilane, bis(tertiary-butylamino)silane and bis(Diethylamino)silane are precursors for the chemical vapor deposition of uniform silicon nitride, silicon oxynitride and silicon dioxide films used in semiconductor device fabrication.

Information disclosed in this Background section of the present disclosure was already recognized by the inventors or acquired during the process of attaining the present invention. Therefore, the Background section of the present disclosure may contain information that is not prior art because the information may not be known to a person of ordinary skill in the art.

SUMMARY

In accordance with one or more embodiments, there is provided a method for selective recovery of monochlorosilane and dichlorosilane in polysilicon production process, including: i) discharging an exhaust gas from a chemical vapor deposition reactor for producing polysilicon, wherein the exhaust gas includes at least hydrogen, hydrogen chloride, silicon tetrachloride, trichlorosilane, monochlorosilane and dichlorosilane; ii) removing the hydrogen and hydrogen chloride from the exhaust gas in a gas recovery system to produce a condensate; iii) removing the silicon tetrachloride and the trichlorosilane from the condensate using a set of distillation columns to produce a hydrogen silicon-tetrachloride trichlorosilane removed result; and iv) selectively recovering an upper stream and lower stream from the hydrogen silicon-tetrachloride trichlorosilane removed result, in a selective distillation column, wherein the upper stream comprises monochlorosilane and the lower stream comprises dichlorosilane.

In one or more embodiments, the selective recovery of the upper stream and the lower stream may include selecting a first mode or a second mode, wherein the first mode includes recovering the upper stream to collect separately, and recovering the lower stream to introduce the lower stream to the set of distillation columns; and wherein the second mode is recovering the lower stream to collect separately from the upper stream and recovering the upper stream to introduce the upper stream to the set of distillation columns.

In one or more embodiments, a method for selective recovery of monochlorosilane and dichlorosilane in polysilicon production process may further include reacting the collected upper stream with ammonia to produce trisilylamine or with diisopropylamine to produce diisopropylaminosilane.

In one or more embodiments, a method for selective recovery of monochlorosilane and dichlorosilane in polysilicon production process may further include further includes reacting the collected lower stream with a tertiary-butylamine to produce bis(tertiary-butylamino)silane.

In one or more embodiments, a method for selective recovery of monochlorosilane and dichlorosilane in polysilicon production process may further include reacting the collected lower stream with a diethylamine to produce bis(diethlylamino)silane.

In one or more embodiments, the recovery of the upper stream may occur at a pressure in a range of 3 bars to 7 bars and at a temperature in a range of −2° C. to 26° C. and the recovery of the lower stream may occur at a pressure in a range of 3 bars to 7 bars and at a temperature in a temperature of 42° C. to 74° C.

In one or more embodiments, the recovering the upper stream may occur at a pressure in a range of 1 bar to 16 bars and at a temperature in a range of −30° ° C. to 60° C.; and the recovering the lower stream may occur at a pressure in a range of 1 bar to 16 bars and at a temperature in a range of 8° C. to 115° C.

In one or more embodiments, o the removing the silicon tetrachloride and the trichlorosilane operation may include removing the silicon tetrachloride from the hydrogen and hydrogen chloride removed condensate in a first distillation column; and removing the trichlorosilane from the silicon tetrachloride removed results in a second distillation column.

In one or more embodiments, there is provided is a system for selectively recovering monochlorosilane and dichlorosilane in polysilicon production process including a chemical vapor deposition reactor to produce polysilicon and discharge of an exhaust gas, wherein the exhaust gas comprises hydrogen, hydrogen chloride, silicon tetrachloride, trichlorosilane, monochlorosilane and dichlorosilane; a gas recovery system to introduce the exhaust gas to separate the hydrogen and hydrogen chloride and discharge a first stream without hydrogen; a set of distillation columns to introduce the first stream to separate the silicon tetrachloride and the trichlorosilane and to discharge a second stream; and a selective distillation column to introduce the second stream and selectively discharge an upper stream and a lower stream respectively, wherein the upper stream includes monochlorosilane and the lower stream comprises dichlorosilane.

In one or more embodiments, the selective distillation column may include a top outlet and a bottom outlet, the upper stream may discharge from the top outlet, and the lower stream may discharge from the bottom outlet.

In one or more embodiments, there is provided at a pressure in a range of 3 bars to 7 bars of the selective distillation column, a temperature of the top outlet in the range of −2° C. to 26° C. and a temperature of the bottom outlet in a range of 42° C. to 74° C.

In one or more embodiments, there is provided the selective distribution column may have at a pressure in a range of 1 bar to 16 bars of the selective distillation column; the top outlet may have a temperature of said top outlet from in the range of −30° C. to 60° C.; and the bottom outlet may have a temperature of said bottom outlet from in the range of 8° C. to 115° C.

In one or more embodiments, the set of distillation columns may include at least two distillation columns to separate the silicon tetrachloride and the trichlorosilane respectively.

In one or more embodiments, a system for selectively recovering monochlorosilane and dichlorosilane in polysilicon production process may further include a reactor for reacting discharged upper stream with ammonia to produce trisilylamine or with diisopropylamine to produce diisopropylaminosilane.

In one or more embodiments, a system for selectively recovering monochlorosilane and dichlorosilane in polysilicon production process may further include a reactor to react the discharged lower stream with tertiary-butylamine to produce bis(tertiary-butylamino)silane.

In one or more embodiments, a system for selectively recovering monochlorosilane and dichlorosilane in polysilicon production process may further include a reactor to react the discharged lower stream with diethylamine to produce bis(diethlylamino)silane.

In one or more embodiments, there is provided selective recovering the monochlorosilane and dichlorosilane contained in the exhaust stream discharged from the chemical vapor deposition reactor for polysilicon production process, which were previously ignored, monochlorosilanes and dichlorosilanes may be obtained with minimal capital investment or complexity.

In one or more embodiments, the amount of monochlorosilane and dichlorosilane may include in the exhaust stream discharged from the chemical vapor deposition reactor in the process of producing polysilicon may be controlled, reduced or removed in the recycle to the polysilicon chemical vapor deposition process to avoid manufacturing lower grade polycrystalline silicon product caused by the recycling of excessive or uncontrolled amounts of monochlorosilane and dichlorosilane.

In one or more embodiments, the precursor for the semiconductor device insulating layers may be prepared using monochlorosilane and dichlorosilane which is recovered from the process of manufacturing polysilicon allowing for additional business with minimal capital investment by within a conventional polysilicon production facility.

Additional aspects will be set forth in part in the description which follows and, in part, will be apparent from the description, or may be learned by practice of embodiments presented in the description which follows.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Figure 1:
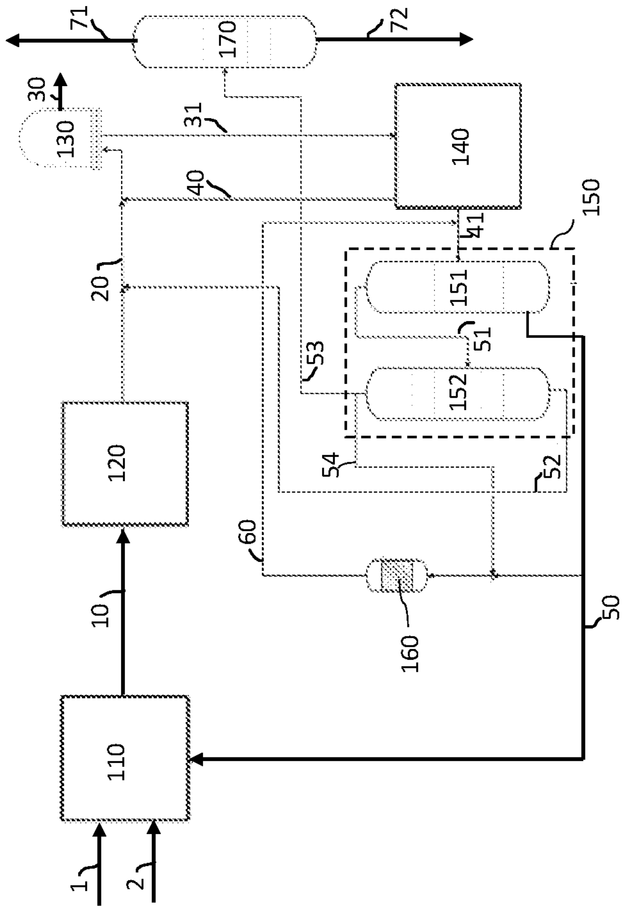
FIG. 1 provides an illustration of an exemplary embodiment of a system used in an embodiment of a method of the present disclosure.

Reference will now be made in detail to embodiments, examples of which are illustrated in the accompanying drawings, wherein like reference numerals refer to the like elements throughout. In this regard, exemplary embodiments may have different forms and should not be construed as being limited to the descriptions set forth herein. Accordingly, exemplary embodiments are merely described below, by referring to the figures, to explain aspects of the present disclosure. As used herein, the term "and/or" includes any and all combinations of one or more of the associated listed items. The suffix "(s)" is intended to include both the singular and the plural of the term that it modifies, thereby including at least one of that term (e.g., the colorant(s) includes at least one colorant). The modifier "about" used in reference to quantity includes the stated value and has the meaning indicated in the context. (For example, it includes the degree of error associated with a specific amount of measurement.) The notation "+/−10%" means that the indicated measurement can be an amount of +10% from an amount of −10% of the stated value. End points of all ranges related to the same component or property may be comprehensively and independently combinable. The disclosure of a narrower or more specific range in addition to the broader range does not deny a wider range or a larger group. The streams introducing or discharging from/to each unit in the figures can be liquid or gas, or a mixture of liquid and gas, depending on the environmental condition.

FIG. 1 provides an illustration of a system used to recover monochlorosilane and dichlorosilane selectively using polysilicon manufacturing process in accordance with an exemplary embodiment of a system of the present disclosure.

Methods for producing high purity polysilicon include Siemens® method, Fluidized Bed Reactor method and the metal refining method. In an exemplary embodiment, a method for producing polysilicon by Siemens® method is described, but exemplary embodiments of the present disclosure are not limited thereto.

A system 100 according to an exemplary embodiment includes a trichlorosilane production unit (trichlorosilane producer or trichlorosilane generator) 110, a trichlorosilane purification unit (trichlorosilane purifier) 120, a chemical vapor deposition unit (chemical vapor deposition depositor, chemical vapor deposition device, or chemical vapor deposition assembly) 130, a gas recovery unit (a gas recovery assembly or gas recovery device) 140, a distillation column set (distillation column assembly) 150, an ion exchange catalyst reaction unit (ion exchange catalyst reactor) 160, and a selective distillation column 170. Chemical Vapor deposition may be referred to as CVD.

First, approximately 99% pure metal silicon 1 and a chloride and hydrogen source 2 are supplied to the trichlorosilane production unit 110 and reacted to form trichlorosilane (TCS, $SiHCl_3$). In a closed loop process, a silicon tetrachloride stream 50 containing silicon tetrachloride (STC, $SiCl_4$) from the chemical vapor deposition unit 130 is hydrogenated to form trichlorosilane. The silicon tetrachloride stream 50 may also be referred to as first distillation column bottom output stream 50. The trichlorosilane stream 10 containing trichlorosilane is introduced into the trichlorosilane purification unit 120. The trichlorosilane production unit 110 may be a hydrochlorination system.

The trichlorosilane purification unit 120 purifies and distills the trichlorosilane stream 10 from the trichlorosilane production unit 110. Then the trichlorosilane purification unit 120 discharges a purified trichlorosilane stream 20 including trichlorosilane. The purified trichlorosilane stream 20 of trichlorosilane and recycled hydrogen 40 from the gas recovery unit 140 is introduced into the chemical vapor deposition unit 130.

There is at least one reactor and one high temperature silicon rod (not shown) arranged in the chemical vapor deposition unit 130\. Silicon crystals are deposited on the surface of the high temperature silicon rod (not shown) by the hydrogen reduction ($SiHCl_3$ (TCS)+$H_2$ (Hydrogen)→Si (Silicon)+3HCl (hydrogen chloride)) and the thermal cracking reaction of trichlorosilane (4$SiHCl_3$ (TCS)→Si (Silicon)+3$SiCl_4$+(STC)+2$H_2$ (Hydrogen)). This process results in the growth of a polycrystalline silicon rod having a gradually increasing radius and high purity polycrystalline silicon 30 is acquired.

However, since the thermal cracking reaction is fast and reactive to hydrogen reduction, a large amount of the by-product silicon tetrachloride is produced ($SiHCl_3$ (TCS)+HCl (Hydrogen chloride)→$SiCl_4$ (STC)+$H_2$ (Hydrogen)). Also, in a similar way, dichlorosilane (DCS, $SiH_2Cl_2$) is produced from silicon tetrachloride (2$SiHCl_3$ (TCS)→$SiH_2Cl_2$ (DCS)+$SiCl_4$+(STC)), and monochlorosilane (MCS, $SiH_3Cl$) is produced from dichlorosilane (DCS, $SiH_2Cl_2$) (2$SiH_2Cl_2$ (DCS)→$SiH_3Cl$ (MCS)+$SiHCl_3$ (TCS)). Therefore, an exhaust stream 31 from the chemical vapor deposition unit 130 contains at least a large amount of silicon tetrachloride together with unreacted hydrogen, hydrogen chloride, trichlorosilane and the other by-products monochlorosilane and dichlorosilane.

Next, this exhaust stream 31 from the chemical vapor deposition unit 130 is introduced into the gas recovery unit 140. The gas recovery unit 140, which includes at least one condenser and the exhaust stream 31, is ultimately cooled to temperature of −40° C. or less. At this point, unreacted hydrogen and much of the hydrogen chloride remain in the gas state, and the other components remain in the condensate. The remaining condensate (condensate) 41 is introduced into the distillation column set 150. The condensate 41\ which is introduced into the distillation column set 150 contains at least trichlorosilane, silicon tetrachloride, monochlorosilane and dichlorosilane. The recovered hydrogen gas 40 is refined and returned to the chemical vapor deposition unit 130, and thus reused as part of the raw material gas. The recovered hydrogen chloride gas (not shown) may be refined and returned to the trichlorosilane production unit 110, and thus reused as part of the raw material gas.

The distillation column set 150 includes at least one distillation column. According to an exemplary embodiment, the distillation column set 150 includes two distillation columns (first distillation column 151, second distillation column 152). A distillation column is a structure that separates a mixture based on the differing boiling points of its components. It can undergo various distillation methods, such as normal pressure distillation and reduced pressure distillation, among others. Since this is a well-known concept, a detailed description will be omitted.

A condensate 41 is introduced into the first distillation column 151 and is distilled to discharge a silicon tetrachloride stream (first distillation column bottom output stream) 50 containing silicon tetrachloride at the bottom of the first distillation column 151 and discharges a first distillation column top output stream 51 including at least trichlorosilane, monochlorosilane and dichlorosilane at the top of the first distillation column 151. The temperature of the first distillation column 151 is determined based on the boiling point of each material. For example, silicon tetrachloride which has a boiling point of about 58° C. at a pressure of about 1 bar, trichlorosilane which has a boiling point of about 32° C. at a pressure of about 1 bar, dichlorosilane which has a boiling point of about 8° C. at a pressure of about 1 bar, and monochlorosilane which has a boiling point of about −30° C. at a pressure of about 1 bar. Therefore, the temperature at the top of the first distillation column 151 is set to the distillation temperature which is set in the range of more than boiling point of dichlorosilane to less than that of trichlorosilane to recover silicon tetrachloride and trichlorosilane by distillation. For example, the distillation temperature is set preferably from about 8° C. to about 32° C. at the pressure of about 1 bar. However, the distillation temperature is not limited to those described, and may vary with pressure and composition of the mixture.

Next, the above-mentioned first distillation column top output stream 51 from the first distillation column 151 is introduced into the second distillation column 152 and is distilled to discharge a second distillation column bottom output stream 52 which contains trichlorosilane at the bottom of the second distillation column 152 and to discharge a second distillation column top output stream 53 including at least monochlorosilane and dichlorosilane at the top of the second distillation column 152. The temperature at the top of the second distillation column 152 is set to the distillation temperature which is set in the range of more than boiling point of monochlorosilane to less than that of dichlorosilane to recover trichlorosilane by distillation. For example, the distillation temperature is set preferably from about −30° C. to 8° C. at the pressure of about 1 bar. However, the distillation temperature is not limited to those described, and may vary with pressure and composition of the mixture.

The silicon tetrachloride stream (first distillation column bottom output) stream 50 including recovered silicon tetrachloride of the first distillation column 151 is returned to the polysilicon production process and thus reused as part of the raw material for producing the polycrystalline silicon material. For example, the recovered silicon tetrachloride is returned to the trichlorosilane production unit 110 and thus reused as part of raw material for producing trichlorosilane. As another example, the recovered silicon tetrachloride is sent to the ion exchange catalyst reaction unit 160 to turn into trichlorosilane and thus returned to the polysilicon production process. Alternatively, the recovered silicon tetrachloride is returned to both the trichlorosilane production unit 110 and the ion exchange catalyst reaction unit 160. The ion exchange catalyst reaction unit 160 may include an ion-exchange resin or ion-exchange polymer. An ion-exchange resin or ion-exchange polymer is a resin or polymer that acts as a medium for ion exchange. For example, a resin or polymer may be a bead-form, weak base anion exchange resin provided for the removal of specific materials from inlet streams.

The second distillation column bottom output stream 52 including recovered trichlorosilane and optionally dichlorosilane from the second distillation column 152, which is returned to the polysilicon production process and thus reused as part of the raw material for producing the polycrystalline silicon material. For example, the recovered trichlorosilane is returned to the trichlorosilane purification unit 120 or the chemical vapor deposition unit 130 and thus reused as part of raw material for producing the polycrystalline silicon material. Alternatively, the recovered trichlorosilane is returned to the trichlorosilane purification unit 120 and the chemical vapor deposition unit 130.

Next, according to an exemplary embodiment, the second distillation column top output stream 53 including at least monochlorosilane and dichlorosilane from the top of the second distillation column 152 introduced into the selective distillation column 170 and is distilled to discharge a first distillation column stream (monochlorosilane stream) 71 including monochlorosilane at a top of the selective distillation column 170 and to discharge second distillation column stream (dichlorosilane stream) 72 including dichlorosilane at the bottom of the column 170. In the selective distillation column 170, various techniques may be employed to achieve this separation. Some common methods may include the use of specific reboilers, condensers, and trays or packing materials designed to target the desired component. Additionally, specific temperatures of the top outlet and the bottom outlet may be set to receive the desired component. The distillation temperature may be set in the range from more than the boiling point of monochlorosilane to less than that of dichlorosilane. For example, the temperature of the top outlet and the bottom outlet may be set as shown in table, according to the pressure.

| Pressure (bar) | Temperature of the top outlet (° C.) | Temperature of the bottom outlet (° C.) |
|---|---|---|
| 1 | −30 | 8 |
| 2 | −13 | 27 |
| 3 | −2 | 42 |
| 4 | 7 | 52 |
| 5 | 15 | 62 |
| 7 | 26 | 74 |
| 11 | 44 | 95 |
| 16 | 60 | 115 |

According to an exemplary embodiment, the temperature of the top outlet of the selective distillation column 170 may be set from about −2° C. to about 26° C. at a pressure from about 3 bar to about 7 bars, and the temperature of the bottom outlet of the selective distillation column 170 may be set from about 42° C. to about 74° C. at a pressure from about 3 bars to about 7 bars. If the pressure is greater than about 7 bars, there is more risk in the case of a loss of containment. Both monochlorosilane and dichlorosilane are pyrophoric materials and may lead to an explosion with a loss of containment. In addition, if the column is operated at too high of a pressure, separate pumps may be required to feed the stream to the selective distillation column 170. In the case the pressure is less than about 3 bars, separate pumps and low temperature refrigeration system may also be required to discharge the stream from the selective distillation column 170. Therefore, the above-mentioned distillation temperature is required to avoid installing additional equipment and to mitigate a loss of containment from the system.

In the selective distillation column 170, monochlorosilane and dichlorosilane may be selectively recovered. The user may optionally recover either monochlorosilane or dichlorosilane, or both monochlorosilane and dichlorosilane at the same time, and output a first distillation column stream (monochlorosilane stream) 71 and/or second distillation column stream (dichlorosilane stream) 72 using the selective distillation column 170.

As a result, monochlorosilane and dichlorosilane in the exhaust stream 31, which has been ignored in the polysilicon manufacturing process, may be recovered by the selective distillation column 170 and used as a raw material to synthesize precursors for semiconductor insulating layers.

Traditionally monochlorosilane and dichlorosilane have been returned to the conventional polysilicon manufacturing process together with trichlorosilane and/or silicon tetrachloride without being recovered separately for reuse. However, dichlorosilane and monochlorosilane are more reactive material compared than trichlorosilane. So, if the amount of dichlorosilane and/or monochlorosilane becomes either too large a part of trichlorosilane feed or if dichlorosilane and/or monochlorosilane has a variable level during the course of a reactor run, the quality of polycrystalline silicon can be affected. For example, even small amounts of variation, for example less than about +/−1 mol % dichlorosilane in trichlorosilane can affect instantaneous growth rates of polysilicon crystal, gas phase nucleation, and therefore overall reactor performance. Also, high and/or variable dichlorosilane and/or monochlorosilane levels can influence dust formation in the gas phase, leading to difficulties in maintaining desired gas temperatures, shortening batch times, and overall productivity. Further, high and/or variable dichlorosilane and/or monochlorosilane levels can be associated with a lower grade polysilicon product manifested by uneven and/or porous silicon crystal growth. However, according to an exemplary embodiment, an amount of dichlorosilane and/or monochlorosilane returning to the polysilicon manufacturing process may be controlled by the selective distillation column 170. Additionally, according to another exemplary embodiment, dichlorosilane and/or monochlorosilane may be removed to prevent dichlorosilane and/or monochlorosilane from being recycled to the polysilicon manufacturing process by recovering dichlorosilane and/or monochlorosilane by the selective distillation column 170.

Next, according to an exemplary embodiment, the system contains the ion exchange catalyst reactor 160. The recovered monochlorosilane in the first distillation column stream (monochlorosilane stream) 71 and/or dichlorosilane in the second column distillation steam (dichlorosilane stream 72) from the selective distillation column 170 may be introduced into the ion exchange catalyst reactor 160 and reacted with recovered silicon tetrachloride in the silicon tetrachloride stream (first distillation column bottom output stream) 50 discharged from the distillation column set 150. In the ion exchange catalyst reactor 160, monochlorosilane and/or dichlorosilane may be converted to trichlorosilane by the ion exchange reaction. For example, monochlorosilane is turned into dichlorosilane and silane ($2SiH_3Cl$ (MCS)+$SiCl_4$ (STC) →$3SiH_2Cl_2$ (DCS)). And dichlorosilane is reacted with silicon tetrachloride and turned into trichlorosilane ($SiH_2Cl_2$ (DCS)+$SiCl_4$+(STC)→$2SiHCl_3$ (TCS)). The produced trichlorosilane of the ion exchange catalyst reactor 160 is returned to the polysilicon production process and thus reused as part of the raw material for producing the polycrystalline silicon material.

Figure 2:
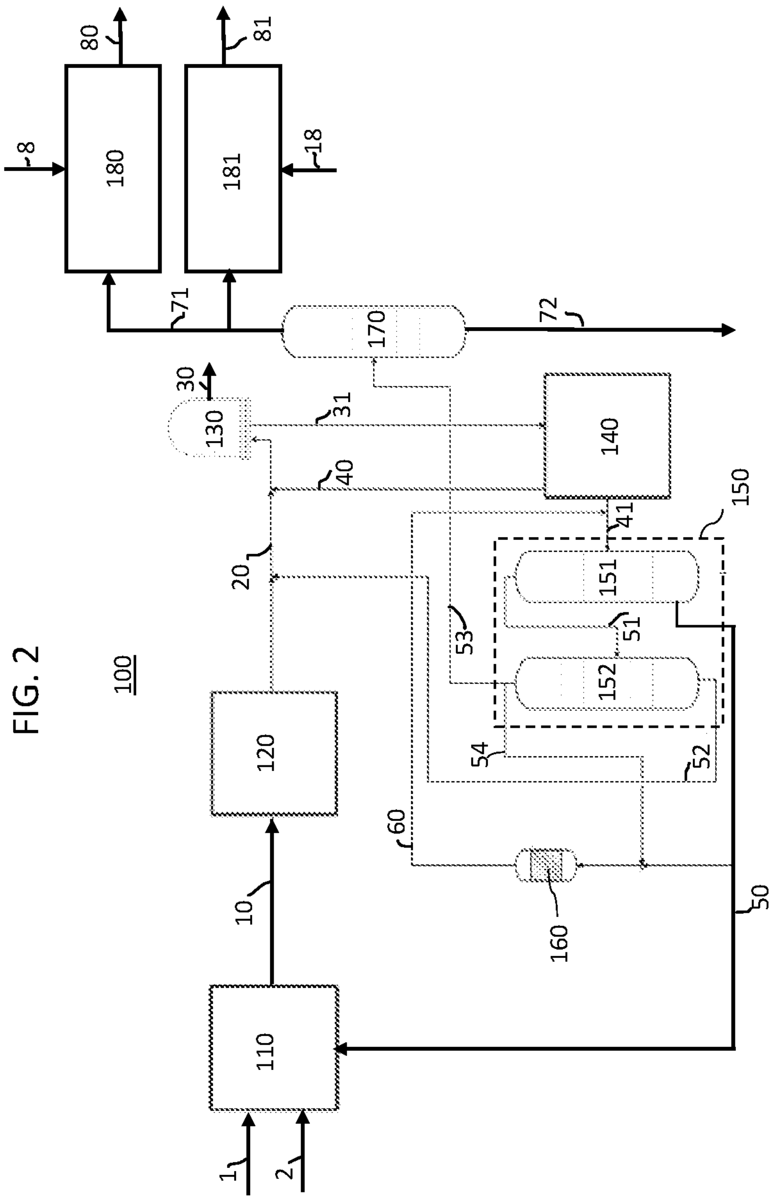
FIG. 2 provides an illustration of a first mode of the system of FIG. 1 used in an exemplary embodiment of a method of the present disclosure.

According to an exemplary embodiment, the selective distillation column 170 may operate at least two modes. FIG. 2 provides an illustration of the first mode of system 100 used in an exemplary embodiment of a method of the present disclosure. The first mode is that only monochlorosilane in the first distillation column stream (monochlorosilane stream) 71 is recovered and the dichlorosilane 72 the second column distillation stream (dichlorosilane stream) is returned into the polysilicon production process to recycle it.

In the first mode, stream (the first distillation column stream or monochlorosilane stream) 71 which contains monochlorosilane discharged to the top outlet is collected separately. This monochlorosilane can be stored in a container (not shown) or sent to a trisilylamine reactor 180 through a pipe to react with ammonia 8 to form trisilylamine ($3SiH_3Cl$ (MCS)+$4NH_3$ (Ammonia)→$N(SiH_3)_3$ (trisilylamine)+$3NH_4Cl$ (Ammonium chloride)) in a trisilylamine stream 80 discharged from trisilylamine reactor 180 or sent to a diisopropylaminosilane reactor 181 through a pipe to react with diisopropylamine 18 to form diisopropylaminosilane in a diisopropylaminosilane stream 81 discharged from diisopropylaminosilane reactor 181.

Conventionally, people have used the ion exchange catalyst reaction to produce monochlorosilane which is the precursor of trisilylamine and diisopropylaminosilane ($2SiH_2Cl_2$ (DCS)→$SiH_3Cl$ (MCS)+$SiHC_3$(TCS)). However, this reaction also produces silicon tetrachloride and silane as by-product ($2SiH_3Cl$ (MCS)⇔$SiH_4$ (Silane)+$SiH_2Cl_2$ (DCS) and $2SiHCl_3$ (TCS)⇔$SiH_2Cl_2$ (DCS)+$SiCl_4$ (Silane)) which are required to separate, so using this method requires extra capital expense and cost.

However, according to an embodiment, the monochlorosilane contained in the exhaust stream is recovered and used as a precursor of trisilylamine and diisopropylaminosilane. Therefore, there is no problem of waste treatment so trisilylamine or diisopropylaminosilane may be produced at lower cost than above-mentioned conventional way.

Additionally, in the first mode, the second column distillation stream 72 which contains dichlorosilane discharged to the bottom outlet and thus reused as part of raw material for producing polysilicon. For example, the discharged dichlorosilane can be returned to the second distillation column 152, to the second distillation column outlet with stream 54, to the trichlorosilane production unit 110 with silicon tetrachloride stream (first distillation column bottom output 50, to the chemical vapor deposition unit 130 with ion exchange catalyst output stream 60, or to the ion exchange catalyst reaction unit 160 to turn into trichlorosilane and thus returned to the polysilicon production process. The returning ways of dichlorosilane are not limited to those described and may vary with user's demands.

Figure 3:
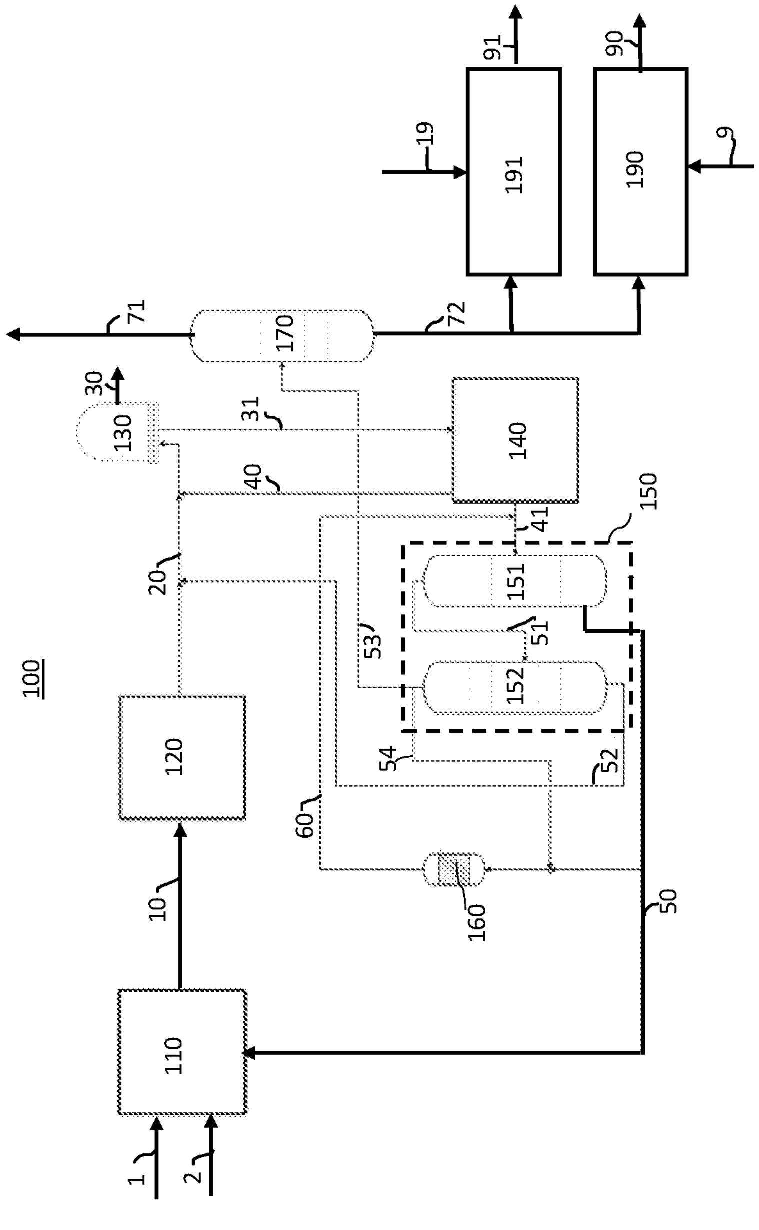
FIG. 3 provides an illustration of a second mode of the system used in an exemplary embodiment of a method of the present disclosure.

FIG. 3 provides an illustration of the second mode of system 100 used in an embodiment of a method of the present disclosure. The second mode is that only dichlorosilane in the second distillation distribution column stream 72 is recovered and monochlorosilane in the first distillation column stream (monochlorosilane stream) 71 is returned into the polysilicon production process to recycle it.

In the second mode, the second distillation distribution column stream 72 which contains dichlorosilane discharged to the bottom outlet is collected separately. This dichlorosilane in the second distillation distribution column 72 can be stored in a container (not shown) or sent to a bis(tertiary-butylamino)silane reactor 190 through a pipe to react with tertiary butylamine 9 (TBA) to form bis(tertiary-butylamino)silane (BTBAS or $SiH_2[CNH(CH_3)_3]_2$)(90) or sent to a bis(diethlylamino)silane reactor 191 through a pipe to react with diethylamine 19 to form bis(diethlylamino)silane 91.

Additionally, in the second mode, the first distillation column stream 71 which contains monochlorosilane discharged to through a top outlet of the selective distillation column 170 and thus reused as part of raw material for producing polysilicon. The discharged monochlorosilane in the first distillation column stream 71 can be returned to the second distillation column 152, to the trichlorosilane production unit 110 with silicon tetrachloride stream (first distillation column bottom output stream) 50, to the chemical vapor deposition unit 130 with ion exchange catalyst output stream 60, or to the ion exchange catalyst reaction unit 160 to eventually turn into trichlorosilane and thus returned to the polysilicon production process. The returning ways of monochlorosilane are not limited to those described and may vary with user's demands.

According to one or more exemplary embodiments shown in FIGS. 2 and 3, the monochlorosilane and/or dichlorosilane is/are recovered separately through the selective distillation column 170 or recycled into the polysilicon process after it is converted to trichlorosilane or silicon tetrachloride. Thus, an exemplary embodiment can prevent monochlorosilane and/or dichlorosilane from being directly returned into the chemical vapor deposition unit 130. In the process of an exemplary embodiment, dust occurring by monochlorosilane and/or dichlorosilane to the reactor can be prevented, and high-quality polysilicon can be produced. In addition, the recovered monochlorosilane and/or dichlorosilane can be utilized as a raw material for the precursor of the semiconductor insulating layers to generate economic profit.

According to another exemplary embodiment, various modes may be disclosed in addition to the modes disclosed in one or more exemplary embodiments shown FIGS. 2 and 3.

For example, there may be the third mode that both monochlorosilane and dichlorosilane are recovered separately at the same time. In the third mode, the first distillation column stream (monochlorosilane stream) containing monochlorosilane is recovered from the selective distillation column 170 and the bottom stream (second column distillation stream or dichlorosilane stream) containing dichlorosilane is recovered simultaneously.

According to another exemplary embodiment, o the mode conversion may be performed by various methods. In an exemplary embodiment, the mode may be selected according to user's needs. For example, if the user needs to recover monochlorosilanes, the first mode can be selected by operating valves (not shown) and then monochlorosilane is recovered. If the user needs to recover dichlorosilane, the second mode can be selected by operating valves (not shown) and then dichlorosilane is recovered.

Figure 4:
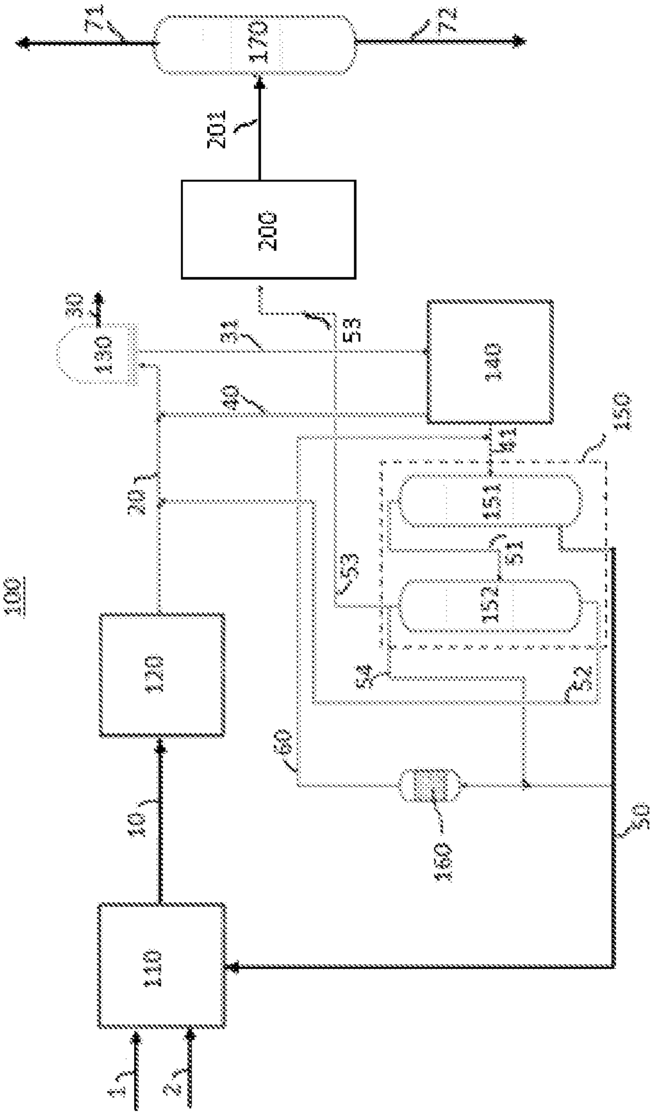
FIG. 4 provides an illustration of a system used in another exemplary embodiment of a method of the present disclosure.

FIG. 4 provides an illustration of the system used in another exemplary embodiment of a method of the present disclosure.

Referring to FIG. 4, the system according to another exemplary embodiment of the present disclosure further includes an adsorbent media 200 before the selective distillation column 170.

The second distillation column top output stream 53 including at least monochlorosilane and dichlorosilane from the top of the second distillation column 152 is introduced into the adsorbent media (200). According to another exemplary embodiment of the present disclosure, the second distillation column top output stream 53 from the top of the second distillation column 152 may contain monochlorosilane, dichlorosilane and siloxane. In detail, the second distillation column top output stream 53 from the top of the second distillation column 152 may contain about 3% of monochlorosilane, about 1% of siloxane, and about 96% of dichlorosilane.

The adsorbent media 200 includes a packed carbon bed. The packed carbon bed may comprise carbon, in a stainless-steel exterior bed with some sort of mesh or filter on the inlet and outlet. Siloxane contamination in the second distillation column top output stream 53 from the top of the second distillation column 152 is removed by the packed carbon bed and there is no siloxane in an adsorbent media output stream 201 from the adsorbent media 200.

The packed carbon bed may catalyze disproportionate the second distillation column top output stream 53 from the top of the second distillation column 152 into a mixture of monochlorosilane, dichlorosilane, trichlorosilane and small amounts of silicon tetrachloride while adsorbing siloxane. The act of the surface adsorption catalyzes the disproportionation by trapping a Cl or H atom, so the process may generate trichlorosilane, silicon tetrachloride, and silane. Further, the reaction mechanism catalyzed by the packed carbon media with dichlorosilane may make more monochlorosilane. Therefore, this mechanism in turn increases the quantity of monochlorsilane in the adsorbent media output stream 201 discharged from the adsorbent media 200 and the overall monochlorsilane yield for the process.

Therefore, the adsorbent media output stream 201 discharged from the adsorbent media 200 may contain monochlorosilane, dichlorosilane, trichlorosilane, silicon tetrachloride, and silane. Siloxane contaminant remains adsorbed on surface of adsorbent media 200 and is not present in the adsorbent media output stream 201 discharged from the adsorbent media 200.

Next, the adsorbent media output stream 201 discharged from the adsorbent media 200 may be introduced into the selective distillation column 170 and is distilled to discharge a first distillation column stream 71 including monochlorosilane and higher boilers at the top of the selective distillation column 170 and to discharge the second distillation column stream 72 including dichlorosilane and lower boilers at the bottom of the selective distillation column 170. Regarding other processes, including the use of the selective distillation column, redundant descriptions will be omitted since they are identical to the description provided in FIGS. 1 to 3 above.

Figure 5:
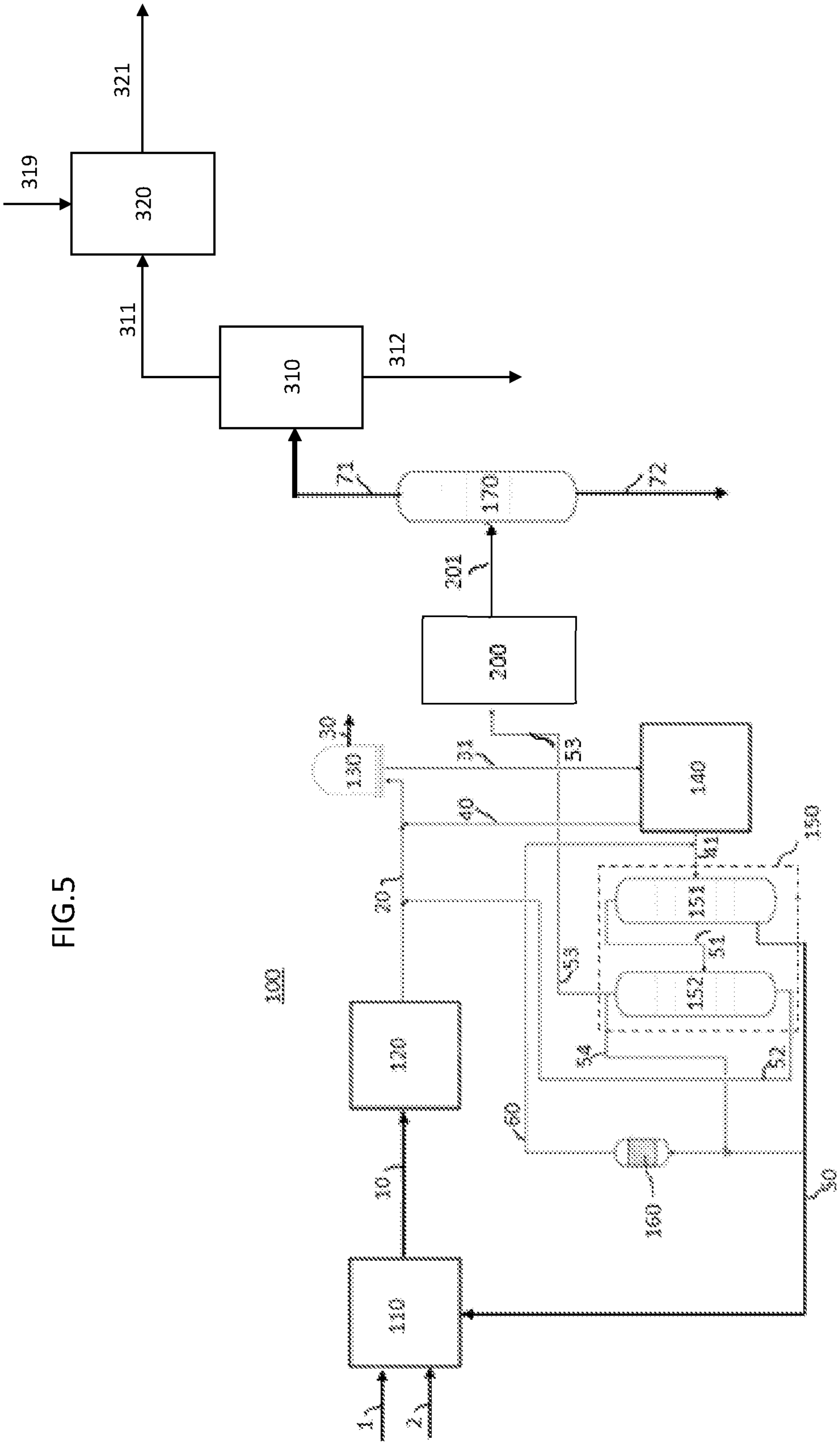
FIG. 5 provides an illustration of a system used in another exemplary embodiment of a method of the present disclosure.

FIG. 5 provides an illustration of the system used in the other exemplary embodiment of a method of the present disclosure.

Referring to FIG. 5, the system according to the another exemplary embodiment of the present disclosure, includes a stripping tank column 310 and disproportionation bed 320 after the selective distillation column 170.

The first distillation column stream 71 from the adsorbent media 200 may include monochlorosilane but also may include silane ($SiH_4$) as a byproduct.

According to the another exemplary embodiment of the present disclosure, the first distillation column stream 71 including monochlorosilane and silane ($SiH_4$) from the top of the selective distillation column 170 is introduced into a stripping tank column 310. The stripping tank column 310 may be distilled to discharge a first stripping tank column discharge stream 311 including silane at the top of the stripping tank column 310, and to discharge a second stripping tank column discharge stream 312 including monochlorosilane at the bottom of the stripping tank column 310. The stripping tank column 310 may act as a product tank column. The stripping tank column 310 may be a small tower with a condenser on top, where the silane is stripped from the first distillation column stream 71.

The stream stripping tank column discharge 311 from the stripping tank column 310 including silane is introduced into a disproportion bed 320. The disproportion bed 320 may be a neutral ion exchange reactor used as fluid bed resin where a tetrachlorosilane stream 319 including tetrachlorosilane may be fed. The disproportion bed 320 may turn the silane into a chlorosilane mixture with an excess of tetrachlorosilane. The chlorosilane mixture including dichlorosilane, trichlorosilane, and tetrachlorosilane discharged from the disproportion bed 320 is shown as a disproportion bed discharge stream 321 in FIG. 5.

The disproportion bed discharge stream 321 may be fed back into a polysilicon plant. The disproportion bed discharge stream 321 including the chlorosilane mixture may be recycled back into a column. Especially trichlorosilane, and tetrachlorosilane may be used for polysilicon manufacturing. Regarding other processes, including the use of the selective distillation column, redundant descriptions will be omitted since they are identical to the description provided in FIGS. 1 to 4 above.

It should be understood that the exemplary embodiments described therein should be considered in a descriptive sense only and not for purposes of limitation. Descriptions of features or aspects within each embodiment should typically be considered as available for other similar features or aspects in other embodiments.

While one or more exemplary embodiments of the present invention have been described with reference to the figures, it will be understood by those of ordinary skill in the art that various changes in form and details may be made therein without departing from the spirit and scope of the present invention as defined by the following claims.

The invention claimed is:

1. A method for selectively recovering monochlorosilane and dichlorosilane in a polysilicon production process, comprising:

i) discharging an exhaust gas from a chemical vapor deposition reactor for producing polysilicon, wherein the exhaust gas includes hydrogen, silicontetrachloride, trichlorosilane, monochlorosilane and dichlorosilane;

ii) removing the hydrogen from the exhaust gas in a gas recovery device to produce a hydrogen removed condensate;

iii) removing the silicon tetrachloride and the trichlorosilane from the hydrogen removed condensate using a set of distillation columns to produce a hydrogen silicontetrachloride trichlorosilane removed result; and iv) selectively recovering an upper stream and lower stream from the hydrogen silicon-tetrachloride trichlorosilane removed result in a selective distillation column, wherein the upper stream comprises monochlorosilane and the lower stream comprises dichlorosilane.

2. The method of claim 1, wherein the selective recovering of the upper stream and the lower stream comprises:

selecting a first mode or a second mode;

wherein the first mode includes recovering the upper stream to collect separately, and recovering the lower stream to introduce to the lower stream to the set of distillation columns; and wherein the second mode includes recovering the lower stream to collect separately, and recovering the upper stream to introduce the upper stream to the set of distillation columns.

3. The method of claim 2, further comprises:

reacting the collected upper stream with ammonia to produce trisilylamine.

4. The method of claim 2, further comprises:

reacting the collected lower stream with tertiary-butylamine to produce bis(tertiary-butylamino) silane.

5. The method of claim 2, further comprises:

reacting the collected lower stream with diethylamine to produce bis(diethlylamino)silane.

6. The method of claim 1, wherein:

the recovering the upper stream occurs at a pressure in a range of 1 bar to 16 bars and at a temperature in a range of from −30° C. to 60° C.; and the recovering the lower stream occurs at a pressure in a range of 1 bar to 16 bars and at a temperature in a range of from 8° C. to 115° C.

7. The method of claim 1, wherein the removing the silicontetrachloride and the trichlorosilane comprises:

removing the silicontetrachloride from the hydrogen removed condensate in a first distillation column to produce silicontetrachloride removed results; and removing the trichlorosilane from the silicontetrachloride removed results in a second distillation column.

8. A system for selectively recovering monochlorosilane and dichlorosilane in polysilicon production process comprising, a chemical vapor deposition reactor to produce polysilicon and discharge an exhaust gas, wherein the exhaust gas comprises hydrogen, silicontetrachloride, trichlorosilane, monochlorosilane and dichlorosilane;

a gas recovery device to introduce the exhaust gas to separate the hydrogen and to discharge a first stream without hydrogen;

a set of distillation columns to introduce the first stream to separate the silicontetrachloride and the trichlorosilane and to discharge a second stream; and a selective distillation column to introduce the second stream and selectively discharge an upper stream and a lower stream respectively, wherein the upper stream comprises monochlorosilane and the lower stream comprises dichlorosilane.

9. The system of claim 8, wherein the selective distillation column comprises a top outlet and a bottom outlet, the upper stream discharges from the top outlet and the lower stream discharges from the bottom outlet.

10. The system of claim 9, wherein:

the selective distillation column has a pressure in a range of 1 bar to 16 bars;

the top outlet has a temperature in the range of-30° C. to 60° C.; and the bottom outlet has a temperature in the range of 8° C. to 115° C.

11. The system of claim 8, wherein the distillation column set comprises at least two distillation columns to separate the silicontetrachloride and the trichlorosilane respectively.

12. The system of claim 8, further comprises:

a reactor to react discharged upper stream with ammonia to produce trisilylamine.

13. The system of claim 8, further comprises:

a reactor to react the discharged lower stream with tertiary-butylamine to produce bis(tertiary-butylamino) silane.

14. The system of claim 8, further comprises:

a reactor to react the discharged lower stream with diethylamine to produce bis(diethlylamino)silane.

* * * * *